3,560,336
PROCESS FOR THE PREVENTION OR REDUCTION OF CARBON DEPOSITS ON METAL SURFACES IN A NUCLEAR REACTOR
Walter Karcher, Alkmaar, Netherlands, assignor to European Atomic Energy Community (Euratom), Brussels, Belgium
No Drawing. Filed Feb. 12, 1968, Ser. No. 704,526
Claims priority, application Netherlands, Mar. 19, 1967, 6703688
Int. Cl. G21c 9/00, 15/28
U.S. Cl. 176—38     2 Claims

ABSTRACT OF THE DISCLOSURE

A method of reducing carbon deposits on the metal surfaces of heat exchangers in a nuclear reactor operating at a high temperature and cooled with gas which comprises adding up to 0.1 gram of a silane such as triethyl silane per liter of cooling gas to the cooling gas either in the heat-exchanger or upstream just preceding the heat-exchanger.

---

The invention relates to a process for the prevention or reduction of carbon deposits on metal surfaces in a nuclear reactor operating at a high temperature and cooled with gas.

Nuclear reactors (referred to hereinafter as HTGR) have recently been built that operate at a high temperature and are cooled with gas such as helium or carbon dioxide. These reactors are mainly operated with unenriched or slightly enriched fuels and are moderated with graphite. The operating temperature of a reactor of this kind may easily be more than 1000° C., and reactors are known in which the cooling gas, for example helium, reaches a temperature of more than 800° C. The temperature of the cooling gas in the heat-exchangers of these reactors is then often more than 500° C. It has been found that in a helium-cooled HTGR metal surfaces in general and in particular the surfaces of the heat-exchangers have between 300 and 600° C. a catalytic effect on the deposition of carbon. It is known that iron catalyses the following reactions at these temperatures:

(1)          $CO + H_2 \rightleftarrows C + H_2O$ 

(2)          $2CO \rightleftarrows C + CO_2$ 

Since the deposition of carbon is evidently connected with the concentration of carbon monoxide and hydrogen in the cooling gas, this deposition takes place principally if the concentrations in question come above a normal level of less than 1 part by volume per million, which usually is the case, for example, when a reactor is started. In such a reactor many parts of the core are made of graphite, and as a result of the increase in the temperature when the reactor is started, degassing of this graphite takes place, whereby the above-mentioned concentrations are increased. The carbon monoxide content and/or hydrogen content in the cooling gas may also be increased considerably when water is present in the cooling gas, resulting in increased oxidation of the graphite.

According to the invention the deposition of carbon on metal surfaces in such reactors can be prevented or reduced by adding a volatile silicon compound to the gas current in the reactor in a low concentration. It is particularly advantageous to add these silicon compounds to the gas current at or just before the place where the carbon deposition takes place, particularly in the heat-exchangers of the reactor or upstream in the gas current just before the heat-exchangers. A possible explanation of the fact that this addition prevents or at any rate reduces carbon deposits on the metal surfaces in question is that the volatile silicon compounds decompose at the operating temperature in the reactor, whereupon a protective surface layer is formed on the metal surfaces, so that they can no longer exert their catalytic activity with respect to the above-mentioned reactions.

In the process according to the invention use is preferably made of volatile silicon compounds consisting of a silane or an organic silicon compound, and in particular it has been found that the desired effect is caused by triethylsilane, a commercially available compound with a boiling point of about 107° C. By "volatile silicon compounds" it is meant that the compounds must be gaseous at the operating temperature of the reactor, and silicon compounds other than triethylsilane have the same effect.

The silicon compound is used in a low concentration, and a concentration of about 0.1 g./litre of cooling gas may be regarded as a top limit. The appropriate concentration of the silicon compound naturally depends on the quantities of carbon monoxide and hydrogen present in the cooling gas. As the following tests indicate, even smaller quantities than 0.1 g./litre of cooling gas may be active under the operating conditions of the reactor.

A great advantage of the process according to the invention is that it is not necessary to add the silicon compound continuously to the gas current, and according to an advantageous embodiment of the process the silicon compound is added only whenever a high concentration of carbon monoxide and hydrogen is found in the cooling-gas circuit. This discontinuous metering of the silicon compound may where appropriate be connected to instruments that check the content of carbon monoxide and/or hydrogen in the reactor. This results in a particularly cheap method of counteracting the disadvantageous deposition of carbon on reactor parts.

The following tests were based on two identical iron or steel specimens. One of the two specimens was pretreated with the volatile silicon compound and the other was used for comparison.

In the first test specimens of pure electro-polished iron were taken. One specimen was exposed for 12 hours at a temperature of 500° C. to an inert gas atmosphere containing 0.07 g. of triethylsilane per litre. Then both specimens were exposed at a temperature of 500° C. to a current of argon gas containing 1% by volume of carbon monoxide and 1% by volume of hydrogen. After treatment of 120 hours the non-pretreated specimen had a carbon deposit of about 20 mg. per cm.$^2$, while the other specimen, which was treated with silane, had a carbon deposit of less than 0.2 mg. per cm.$^2$.

In a second test specimens of German soft steel ST 35.8 were used. One specimen was given the same silane pretreatment as described for the first test. Then both specimens were exposed to a current of argon gas for 24 hours at 550° C., the argon contained 5% by volume of carbon monoxide and 5% by volume of hydrogen. No carbon deposit was observed on the silane-pretreated steel specimen, while the untreated specimen had a carbon deposit of more than 10 mg./cm.$^2$. It may be assumed that with the much lower concentrations of carbon monoxide and hydrogen as they occur in a HTGR a much smaller dose of the silicon compound may be enough to prevent entirely these deposits on metal surfaces.

Good results were also obtained when dichlorodiethylsilane $(C_2H_5)_2SiCl_2$ was ued to inhibit carbon deposits on metal surfaces. In a third test 0.1% by volume of this silane was added directly to the current of argon gas under the same conditions as in the first test but without pretreatment; the current of argon gas also contained 1% by volume of carbon monoxide and 1% by volume of hydrogen. Although the addition of the silane was stopped after 2 hours, no carbon deposits were found after 48 hours of gas flow at 500° C. In a comparative test, on the other hand, without the temporary addition of silane this deposition was 3–4 mg./cm.$^2$ in the same period. After a flow of 100 hours these figures were 1.5 and 15 mg./cm.$^2$ respectively for the inhibited and non-inhibited specimens.

Triphenylmethylsilane $(C_6H_5)_3 CH_3Si$ has also been found to be a suitable inhibitor. In this case the inhibitor is introduced into the heat-exchangers in the solid state. The vapour pressure of this substance is at a temperature of 400–500° C. enough to prevent carbon deposits on metal surfaces.

The invention includes an HTGR provided with means for injecting a volatile silicon compound into the gas stream at or just before the heat exchanger or heat exchangers.

I claim:

1. A process for the reduction of carbon deposits on the metal surfaces of heat-exchangers in a nuclear reactor operating at a high temperature and cooled with gas which comprises adding a compound selected from the group consisting of triethyl silane, dichlorodiethyl silane, and triphenyl methyl silane, to the cooling gas adjacent to the place of entry of the cooling gas into the heat-exchanger in an amount of at most 0.1 gram of compound per liter of cooling gas, and forming a silicon protective coating on the metal surfaces by decomposition of said compound.

2. A process according to claim 1 which comprises adding the selected compound discontinuously whenever a high concentration of carbon monoxide and hydrogen is present in the cooling gas circuit.

References Cited

UNITED STATES PATENTS

| | | | |
|---|---|---|---|
| 2,859,138 | 11/1958 | Blanchard | 176—92 |
| 2,907,689 | 10/1959 | Kidder et al. | 176—38 |
| 2,977,260 | 3/1961 | Biefer et al. | 176—38 |
| 3,108,051 | 10/1963 | Lindstrom | 176—38 |
| 3,294,644 | 12/1966 | Walton | 176—92 |
| 3,335,062 | 8/1967 | Feates et al. | 176—92 |
| 3,373,083 | 3/1968 | Koch et al. | 176—38 |

FOREIGN PATENTS

| | | | |
|---|---|---|---|
| 735,586 | 5/1966 | Canada | 176—38 |

CARL D. QUARFORTH, Primary Examiner

H. E. BEHREND, Assistant Examiner

U.S. Cl. X.R.

176—92